June 4, 1968  W. J. BLAZEK ET AL  3,386,781
DIE SET HAVING READILY DEMOUNTABLE GUIDE PINS AND BUSHINGS
Filed Jan. 24, 1966  2 Sheets-Sheet 1

INVENTORS
WILLIAM J. BLAZEK &
CLINTON D. HILLIS
BY MAHONEY, MILLER & RAMBO
BY *W. H. Rambo*
ATTORNEYS June 4, 1968 W. J. BLAZEK ET AL 3,386,781
DIE SET HAVING READILY DEMOUNTABLE GUIDE PINS AND BUSHINGS
Filed Jan. 24, 1966 2 Sheets-Sheet 2

INVENTORS
WILLIAM J. BLAZEK &
CLINTON D. HILLIS
BY
MAHONEY, MILLER & RAMBO
BY
ATTORNEYS

United States Patent Office 3,386,781
Patented June 4, 1968

3,386,781
DIE SET HAVING READILY DEMOUNTABLE GUIDE PINS AND BUSHINGS
William J. Blazek and Clinton D. Hillis, New Lexington, Ohio, assignors to Lempco Industries Inc., a corporation of Ohio
Filed Jan. 24, 1966, Ser. No. 522,520
7 Claims. (Cl. 308—4)

ABSTRACT OF THE DISCLOSURE

A die set in which relatively reciprocating die-supporting plates are maintained in exacting alignment by relatively telescoping guide pins and bushings detachably secured to the respective plates by quick-disconnect clamping means which provide for initial radial adjustment or indexing of the guide pins and bushings on their respective plates to insure proper axial alignment of the pins and bushings.

---

The present invention relates generally to die sets, mold sets and similar apparatus in which a pair of die or mold-supporting plates or members are arranged for relative reciprocation and are maintained in exacting alignment by relatively telescoping guide pin and bushing means. More specifically, this invention is concerned with an improved die set in which both the guide pins and bushings are secured to their respective supporting plates or shoes by detachable clamp means so arranged and constructed as to insure "squareness" or true perpendicularity of the axes of the pins and bushings with respect to the working faces of the plates or shoes, exacting axial alignment between the relatively engaging pins and bushings, and parallelism between the axes of the relatively spaced sets of pins and bushings.

In the past, it has been common practice in the manufacture and assembly of die sets to mount the individual guide pins and guide bushings by means of a slip, press, or interference fit of the same in highly precision machined bores or sockets formed in the associated plates or shoes of the die set. As will be readily understood by those familiar with machining operations, the boring, or drilling and finish machining of geometrically perfect, accurately located, relatively spaced openings, bores, or sockets in relatively heavy steel plate stock requires a high degree of accuracy and precision and, hence, is comparatively costly. Also, in die sets comprising a plurality of relatively spaced apart sets of pins and bushings, it is essential that the centers of the pin and bushing-receiving bores or sockets formed in the plates or shoes be most accurately located, not only with respect to the centers of the other bores or sockets of the same plate, but also with respect to the centers of the bores or sockets of the opposite plate, otherwise the axes of the relatively telescoping pins and bushings will be relatively offset or misaligned, with consequent binding or sticking of the pins and bushings upon reciprocation of the plates of the die set. Further, to insure proper alignment and mating of punch and die parts carried by the plates or shoes of the die set, it is essential that the bores or sockets which receive and hold the guide pins and bushings be machined so as to provide "squareness" or true perpendicularity of the axes of the bores or sockets with respect to the working surfaces or faces of the plates or shoes. Another difficulty attendant to the manufacture of die sets having tubular bushings which are precisely located by insertion into bores or sockets formed in the associated plate or shoe, is the tendency of the bushing to collapse or decrease in internal diameter in the area thereof which is inserted in the plate or shoe. This "shrinkage" of internal diameter generally requires additional drilling and/or honing of the internal bore of the bushing after installation thereof to restore its original dimensions.

Accordingly, the primary object of the present invention is to provide a die set whose construction and assembly is such as to overcome the aforementioned difficulties and objections attendant to prior art die sets having press-fitted or interference-fitted pins and bushings, and which is materially more economical to manufacture and assemble.

Another object of this invention is to provide a die set having relatively telescoping guide pins and bushings which are so formed as to permit the same to be detachably and adjustably clamped to a pair of opposed die-supporting plates and thereafter assure free and accurately guided reciprocation of such plates and the die elements which are carried by such plates.

A further object of the invention is to provide a die set which eliminates the need for expensive, precision machined bores or sockets in the die-supporting plates, and one in which the guide pin and bushing elements are readily demountable from the plate or shoe member of the die set, so as to facilitate compact storage and/or shipment of the die set.

Yet another object is to provide a guide pin and bushing assembly which is interchangeable between different sets of plates or shoes.

For a further and more detailed understanding of the present invention and the additional objects and advantages thereof, reference is made to the following description and the accompanying drawings, wherein.

Figure 1:
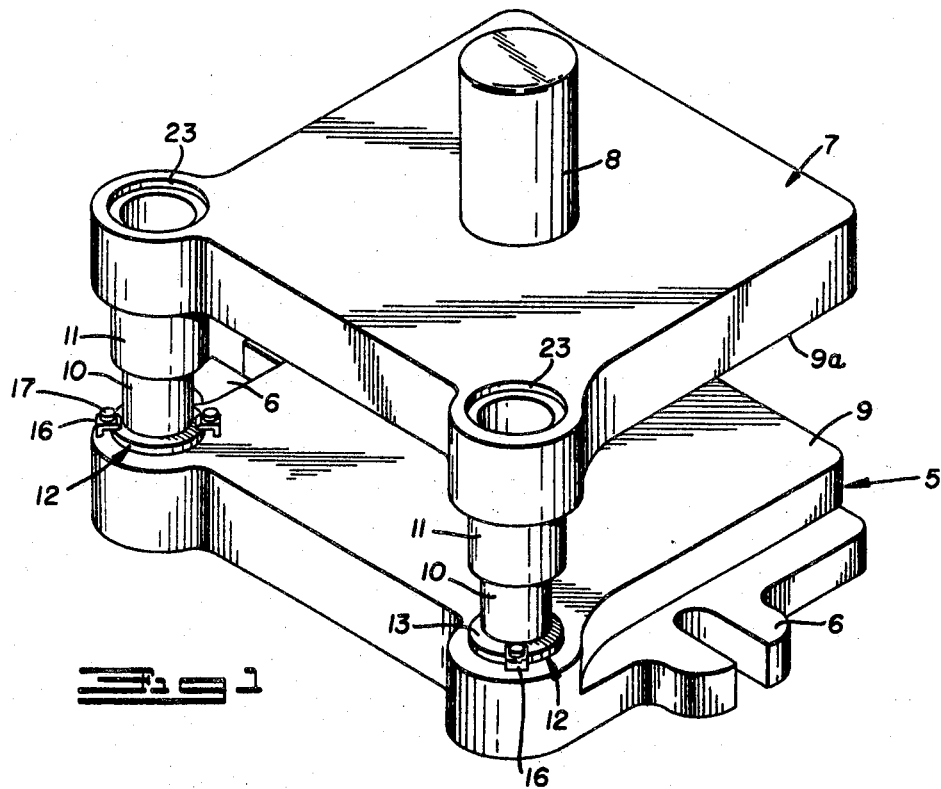
FIG. 1 is a perspective view of a die set embodying the present invention.
Figure 4:
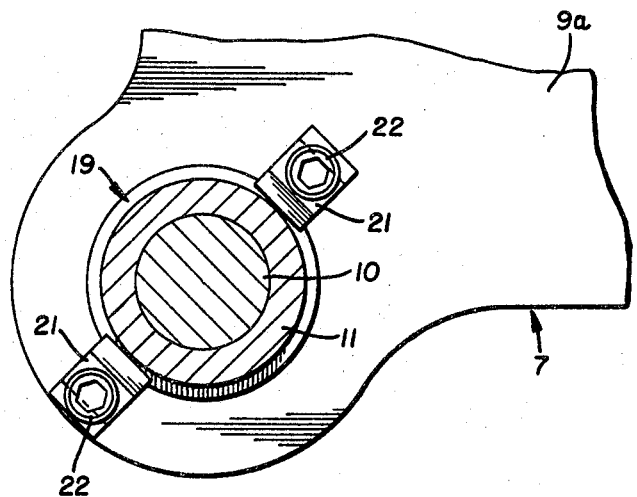
FIG. 4 is a similar view taken along the line 4—4 of FIG. 2.

Referring now to the drawings, FIG. 1 illustrates a die set constructed in accordance with the present invention and which comprises a lower, generally rectangular, plate or shoe 5 which, in the usual manner, is adapted for rigid connection with the stationary bed or bolster of a mechanical or hydraulic press, not shown. The anchoring of the lower shoe 5 to the bed of the associated press is facilitated by a pair of laterally extended, bolt-receiving bosses or flanges 6 formed on either side of the lower shoe 5. The die set also includes an upper, generally rectangular plate or shoe 7 which is provided with the usual upstanding, centrally located shank 8 for connection with the movable platen or ram, not shown, of the associated press. Thus, in the usual manner, the lower and upper shoes 5 and 7 provide a pair of opposed, relatively reciprocating working surfaces, 8 and 9, respectively, to which a pair of relatively mating male and female punch and die elements, not shown, may be respectively attached to perform a given punching, stamping, blanking or forming operation.

Associated with the lower shoe 5 are a pair of upstanding guide posts or pins 10 which are arranged to closely telescope within a pair of tubular guide bushings 11 carried by the upper plate or shoe 7. As will be readily understood by those familiar with the die set art, the purpose of the guide pins and bushings is to maintain exacting alignment between the upper and lower shoes and the relatively mating die elements carried thereby during reciprocating movement thereof within the press, and to prevent lateral, rotational, or angular tilting movement of one shoe with respect to the other during the operation of the associated press.

Figure 2:
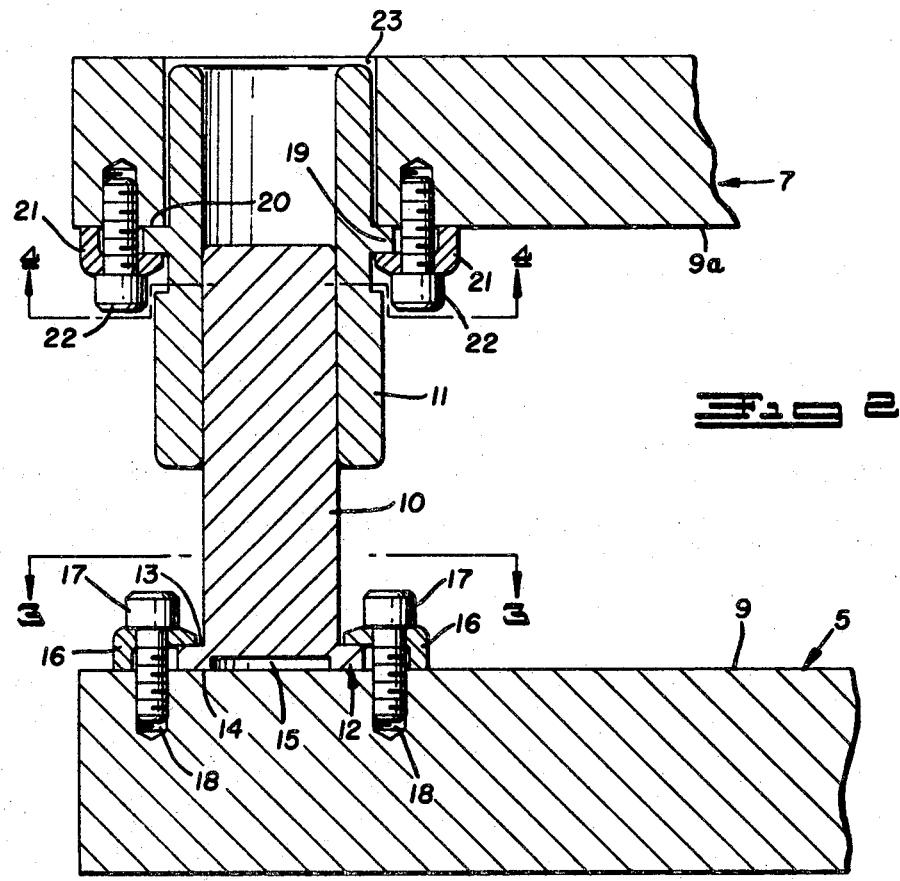
FIG. 2 is an enlarged, fragmentary, vertical sectional view taken through one of the relatively telescoping guide pin and bushing assemblies of the present die set.
Figure 3:
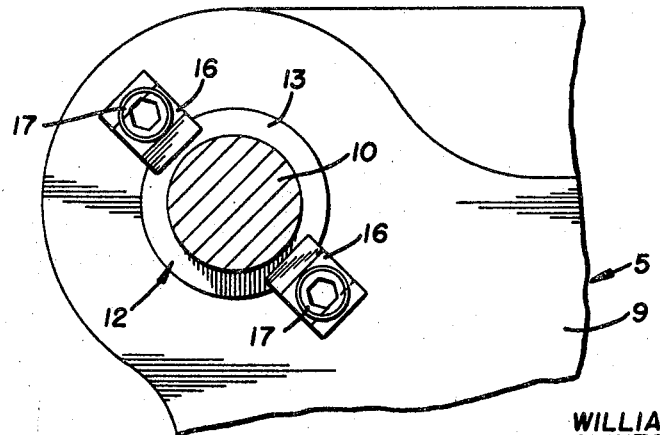
FIG. 3 is a detailed horizontal sectional view taken along the line 3—3 of FIG. 2.

As seen particularly in FIG. 2, each guide pin 10 is formed with an integral diametrically enlarged, circular base portion 12 which defines an upper, annular, clamping shoulder or flange 13 and a lower, recessed, annular bottom surface 14. The base portion 12 of each pin 10 is relieved in its central portion, as at 15, and the annular bottom surface 14 is precision machined and finished so as to provide a flat surface lying in a plane exactly perpendicular to the longitudinal axis of the pin. The pins 10 are arranged to be securely, yet detachably clamped to the upper working surface 8 of the lower shoe 5 by means of a plurality of L-shaped clamp members 16 which overlap and engage the upper clamping flanges 13 of the pins at circumferentially spaced points thereon, and which may be tightened on the flanges 13 of the pins by means of cap screws 17 which pass through the individual clamp members 16 and into threaded bores 18 formed in the lower shoe 5. It should here be understood that the upper working surface 8 of the lower shoe 5 consists of a precision machined and finished flat surface against which the mating flat, annular bottom surface 14 of the guide pins may be clamped to thus insure exact "squareness" or true perpendicularity of the axes of the guide pins 10 relative to the working surface 8 of the lower shoe. This "squareness" is necessary to insure proper alignment of the pins 10 with the bushings 11 and true parallelism between the axes of the pins 10.

Similarly, each of the guide bushings 11 of the die set are arranged to be securely yet detachably clamped to the working surface 9a of the upper shoe 7. Toward this end, each of the bushings 11 is formed intermediate the ends thereof with a circumferential clamping flange or shoulder 19 having a precision machined and finished flat, upper surface 20 disposed in a plane truly perpendicular to the axis of the bushing and arranged to be flatly clamped against the precision machined, flat working surface 9a of the upper shoe by means of L-shaped clamp members 21 and cap screws 22. To provide increased bearing area between the guide pins and bushings and to minimize the shut height of the die set, the upper shoe 7 is preferably formed with rough bored openings or passages 23 to loosely receive the upper, shank portions of the bushings 11. As will be noted from FIG. 2, the bushing-receiving openings 23 have a diameter considerably in excess of the outer diameter of the adjacent shank portion of the bushings 11, but less than the diameter of the clamping shoulder or flange 19. In this manner, the positions of the bushings 11 on the upper shoe may be adjusted radially or laterally within limits prior to tightening the clamp member 21. It should be understood that the bushing-receiving openings or sockets 23 are in nowise essential from the standpoint of providing support for the guide bushings 11, and in die sets where reduced shut height if of no particular moment, the openings 23 may be entirely eliminated by utilizing guide bushings which have their clamping flanges disposed at their extreme upper ends, and which project fully beneath the working surface 9 of the upper shoe. However, as previously indicated, the bushing-receiving bores or openings 23 are preferable where minimized shut height and maximum bearing surface are desired.

One of the primary advantages of the present invention is the comparative ease and simplicity with which the guide pins 10 and bushings 11 may be indexed and assembled in relation to the upper and lower shoes of the die set. By utilizing the detachable mounting clamps 16 and 21, the position of the guide pins 10 and bushings 11 may be initially adjusted within limits to bring the same into exacting relative alignment, and thereafter, by tightening the clamps, the desired exact alignment is maintained. For example, when it is desired to mount the guide pins 10 and bushings 11 on their appointed shoes 5 and 7, the pins 10 and bushings 11 are placed in their approximate positions on the respective shoes, with the clamps 16 and 21 loosely engaging the clamping flanges 12 and 19 of the pins and bushings. The pins and bushings are then moved or shifted laterally on their shoes, so as to permit the pins 10 to telescope freely into the bores of the bushings 11. At this time, the cap screws 17 and 22 are then tightened to force the clamps 16 and 21 into tight clamping engagement with the clamping flanges 12 and 19 of the pins and bushings. Tightening of the screws 17 and 22 causes the flat, precision machined bottom surface 14 of the pins and the precision machined, flat surface 20 of the bushings to be brought into flat engagement with the adjacent, precision machined working surfaces 8 and 9 of the shoes, to thus insure true perpendicularity of the axes of the pins and bushings with respect to the planes of the working surfaces of the shoes, and true parallelism between the axes of the pins and between the axes of the bushings. Following tightening of the screws 17 and 22, the upper shoe 7 and its bushings 11 are freely and easily reciprocal relative to the lower shoe 5 and guide pins 10, and the respective shoe sections may then be separated without disturbing the properly indexed positions of the guide pins and bushings on the shoes.

In view of the foregoing, it will be seen that the present invention provides an improved die set or the like in which the relatively telescoping guide pin and bushing elements are affixed to their respective shoes by detachable clamp means, and in which the guide pins and bushings may be easily and readily adjusted on their respective shoes so as to insure proper alignment of the pins and bushings and true perpendicularity between the axes of the pins and bushings and the working faces of the shoes of the die set. Die sets made in accordance with this invention are characterized by their simplicity of construction, ease of assembly and economy of manufacture. It will also be apparent to those skilled in the art that the present invention is applicable to any types of die sets which utilize relatively telescoping guide pin and bushing members, such as friction-type die sets, or ball bearing, or roller bearing types of die sets.

While a single preferred embodiment of the invention has been illustrated and described in detail, it will be understood that various modifications may be resorted to without departing from the spirit of the invention or the scope of the following claims.

Having thus described this invention, what is claimed is:

1. A die set comprising a pair of members movable toward and from one another; means for maintaining alignment between said members during movement thereof comprising a guide pin carried for limited lateral adjustment on one of said members and telescoping with a tubular guide bushing carried for limited lateral adjustment on the other of said members; and fastening means carried by each of said members for detachably securing said guide pin and bushing respectively thereto, said fastening means providing for limited lateral adjustment of the positions of attachment of said pin and said bushing to said members.

2. A die set according to claim 1, wherein said guide pin is disposed, in its entirety, externally of the member on which it is carried.

3. A die set according to claim 1, wherein each of said pin and bushing is formed with a flat surface disposed in a plane perpendicular to the longitudinal axes of said pin and bushing and arranged for engagement with complemental flat surfaces formed on said members, and wherein said fastening means is operable to securely clamp the said flat surfaces of said pin and bushing to the complemental flat surfaces of said members.

4. A die set according to claim 3, wherein the flat surfaces of said pin and bushing are defined, at least in part, by laterally extended flanges formed theeron, and wherein said fastening means comprise sets of relatively spaced and adjustable clamps carried respectively on each of said members and engageable with the flanges of said pin and bushing respectively.

5. A die set according to claim 3, wherein the flat surface of said pin is relieved in its central portion.

6. In a die set; a pair of plates arranged for relative reciprocation and having relatively opposed flat, parallel surfaces thereon; means for maintaining alignment of said plates during relative reciprocation thereof comprising relatively telescoping guide pin and bushing members carried respectively by said plates, at least one of said guide pin and bushing members being laterally adjustable on its plate and being provided with a flat supporting surface disposed in a plane perpendicular to the longitudinal axis thereof and in flat abutting engagement with the flat surface of the plate on which it is carried; and detachable fastening means connected with the plate carrying said last-named member and operable selectively to permit lateral adjustment of said last-named member on its associated plate and to securely clamp said last-named member in its adjusted position on said plate, whereby to insure exact axial alignment of said said last-named member with the other of said pin and bushing members.

7. A die set according to claim 6, wherein both of said guide pin and bushing members are arranged for limited lateral adjustment on their respective plates, and said pin member terminates in an annular base flange which defines a flat supporting surface for said pin member.

References Cited
UNITED STATES PATENTS

| | | | |
|---|---|---|---|
| 2,370,836 | 3/1945 | Benedetto | 308—4 |
| 2,405,825 | 8/1946 | Grunow | 308—4 |
| 3,219,371 | 11/1965 | Danly | 308—4 X |
| 3,279,870 | 10/1966 | Janiszewski | 308—4 |

FOREIGN PATENTS 633,234   12/1961   Canada.

JAMES M. MEISTER, *Primary Examiner.*